Feb. 14, 1950     E. V. FEJMERT     2,497,160
MACHINE FOR MANUFACTURING HOLLOW
BODIES OF PLASTIC MATERIAL
Filed Sept. 19, 1945
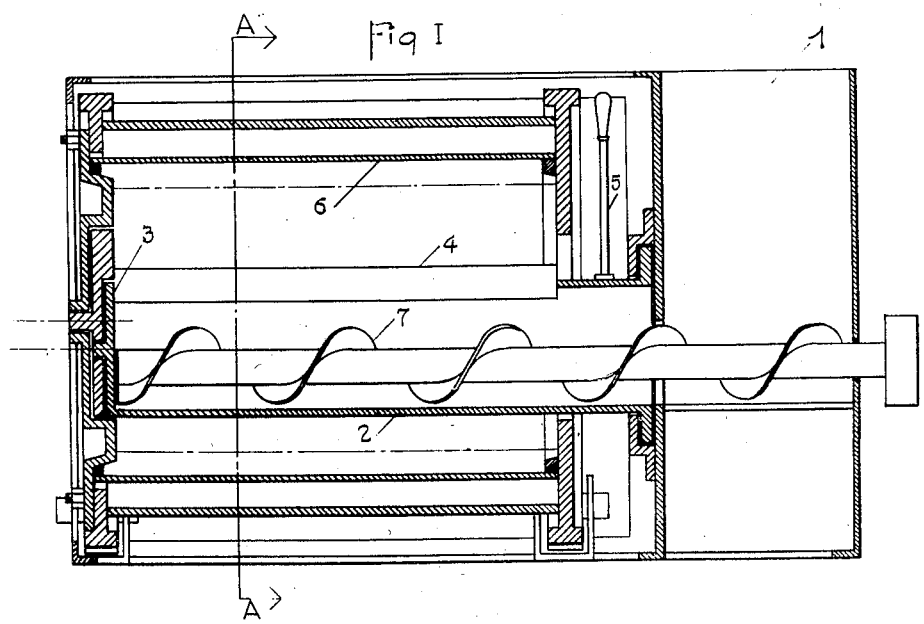
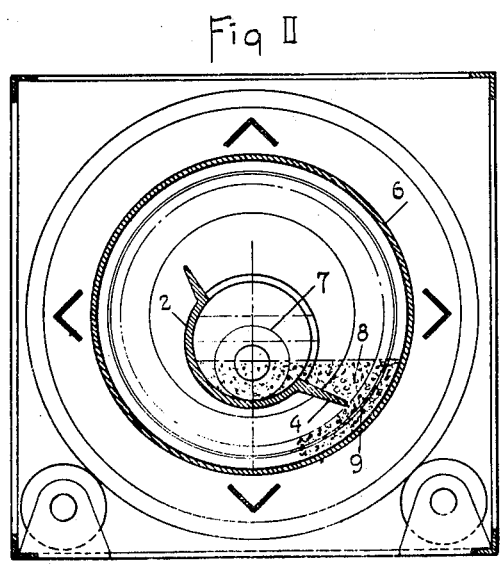
Inventor
V. Fejmert Patented Feb. 14, 1950

2,497,160

UNITED STATES PATENT OFFICE 2,497,160

MACHINE FOR MANUFACTURING HOLLOW BODIES OF PLASTIC MATERIAL

Erik Valdemar Fejmert, Nykoping, Sweden

Application September 19, 1945, Serial No. 617,380
In Sweden October 8, 1938

2 Claims. (Cl. 25—30)

The present invention relates to a machine for making hollow bodies of plastic material, as concrete pipes, in a horizontally revolving mold by employing the centrifugal action in conjunction with frictional forces due to the difference in velocity between the revolving mold and the feeding material.

Several methods for making concrete pipes by centrifugal action are at present employed. By these methods the material is freely disposed to the inside of a revolving mold, usually by means of a feeding bucket, from which the material is fed either by an opening at the bottom side of the bucket or by turning the open top side of the bucket upside down. This free disposal of the material is however combined with several inconveniences. In order to make possible an even spreading of the material and an exact adjustment of the thickness of the wall, the speed of the mold must be kept very low, and the mass will therefore remain in a half-soft condition during the whole feeding operation. In order to get the mass hard enough to stand by itself the mold must be revolved with a very high speed after the feeding operation. On account hereof the heavy particles in the half-soft mass are forced to the outside of the wall and a layer of pure cement and fine sand will be left on the inside of the pipe. The power of resistance of such a layer against wear or attack from aggressive substance is very low. The adjustment of the thickness of the wall by these methods is made by scraping off excessive material from the inside of the pipe. This scraping will easily injure the pipe and may also, if heavy material is used, prevent the exact adjustment of the thickness of the wall. On account hereof heavy particles in the material, which are essential for a good quality of the concrete, cannot be used by these methods.

The object of the present invention is to arrange the feeding of the material in such a way, that heavy particles can be used in the mass without separation and also that the thickness of the wall may be adjusted without scraping or injuring the inside of the pipe. This is obtained by regulating the volume of the material during the feeding operation in such a way, that excessive material cannot fasten on the inside of the pipe. For this purpose the feeding of the material is arranged from a longitudinal feeding tube, open at the top and at one side of this opening furnished with a feeding board of the same length as the pipe. The distance between the outer edge of that feeding board and the inside of the mold is made variable during the feeding operation, whereby the amount of material that can pass through can be regulated according to the thickness of the wall of the pipe or part thereof. During the feeding operation the down pointing feeding board and the inside of the mold will form a pocket from which the material is fed, in a peripheric direction, through said adjustable opening to the inside of the revolving mold. By the friction between the material in the pocket and the rotating mold, or the layer of mass eventually placed on the inside of the mold, the material will be drawn or rolled through the feeding opening with the peripheric speed of the mold. By the combined influence of this rolling action and the centrifugal action the layer formed by the mass passing a certain size of feeding opening will be uniformly spread with an exact thickness and of such hard consistence that even heavy stone material in the next layer can not pass through. Preferably the feeding can be performed with full speed of the mold which will give the highest possible compression without separation event if heavy stone material is used in the mass. This one-speed process will simplify the whole manufacturing problem and reduce the manufacturing cost of the pipe. In order to prevent poor mixing of the particles in the mass during the feeding operation the mass in the pocket may be exposed to a vibration action by means of a vibrator arrangement applied directly to the mass or to the feeding board.

A form of machine for carrying out the process according to this invention is shown in the accompanying drawing, wherein Fig. I is a longitudinal section and Fig. II is a cross section through A—A in Fig. I. The different parts of the machine are marked as follows: 1 is a magazine for the material connected to a feeding tube 2, the outer end of which is closed by an endplate 3. In the top side of the feeding tube 2 is arranged an opening of the same length as the pipe to be made. At one side of this opening is arranged a feeding board 4 of the same length as the opening. The feeding tube 2 can be radially turned by a lever 5 and meanwhile the outer edge of the feeding board 4 may be brought in varied distances to the inside of the mold 6. In this case this variation is performed by placing the axis of turning the feeding tube 2 somewhat below the axis of the revolving mold. The material in the magazine 1 is, in this case, transported into the feeding tube 2 by means of a conveying screw 7. When the feeding tube 2 is turned with the feeding board 4 pointing downwards, as shown in Fig. II, the material in the feeding tube 2 will be discharged into the pocket 8 from which it is drawn or rolled through the feeding opening 9 between the outer edge of the feeding board 4 and the inside of the mold 6. This rolling action is caused by the friction between the inside of the mold 6 and the material in the pocket 8 due to the velocity of the mold 6. When the material has passed the feeding opening 9 in a peripheric direction it will be pressed, by the centrifugal force, against the inside of the mold 6. During the feeding operation the feeding opening 9 is adjusted in such way that the width of said opening corresponds to the desired wall thickness of the pipe. If the wall of the pipe is of great thickness it may preferably be made in several layers in which case the width of the feeding opening 9 is adjusted to correspond with each layer. When the pipe is finished the feeding tube 2 is turned with the feeding board pointing upwards. Excessive material will then remain on the feeding board 4 and later flow back into the feeding tube 2 from which it may be transported back to the magazine 1 by reversing the direction of rotation of the conveying screw.

The process is not limited to a machine of the described type. Thus the feeding tube may be moveable in an axial direction, in and out of the mold, for filling the material into the feeding tube outside the machine, in which case the conveying screw and eventually also the magazine may be eliminated. The adjusting of the width of the opening between the outer edge of the feeding board and the inside of the mold may also be performed in different ways, for example by making the feeding board moveable in a radial direction by means of a screw arrangement.

I claim:

1. A machine for making hollow bodies of plastic material comprising in combination a horizontally disposed rotatable casing, a horizontally disposed rotatable trough within said casing the rotational axis of which is radially removed from that of said casing, a flange extending radially of an edge of said trough, a stationary magazine adjacent one end of said casing and trough and in communication with said trough, means for feeding material from said magazine to said trough for distribution over the flange of said trough, and means for rotating said trough and its flange about its axis during rotational movement of said casing and during the feeding of the plastic material whereby by reason of the axial displacement of said trough and casing said trough can be angularly adjusted for positioning the free edge of the flange a predetermined distance from the internal periphery of the mold casing dependently upon the wall thickness desired of the hollow body to be formed.

2. A machine for making hollow bodies of plastic material comprising in combination a horizontally disposed rotatable casing, a horizontally disposed rotatable trough within said casing the rotational axis of which is radially removed from that of said casing, applicating means carried by and extending from an edge of said trough, a stationary magazine adjacent one end of said casing and trough and in communication with said trough, means for feeding material from said magazine to said trough for distribution over said applicating means of said trough, and means for rotating said trough and its applicating means about its axis during rotational movement of said casing and during the feeding of the plastic material whereby by reason of the axial displacement of said trough and casing said trough can be angularly adjusted for positioning said applicating means a predetermined distance from the internal periphery of the mold casing dependently upon the wall thickness desired of the hollow body to be formed.

ERIK VALDEMAR FEJMERT.

REFERENCES CITED

The following references are of record in the file of this patent:

UNITED STATES PATENTS

| Number | Name | Date |
| --- | --- | --- |
| 2,015,001 | Bishop | Sept. 17, 1935 |
| 2,163,118 | Fejmert | June 20, 1939 |
| 2,222,889 | Hume | Nov. 26, 1940 |
| 2,334,294 | Stevens | Nov. 16, 1943 |